(12) United States Patent
Zapata et al.

(10) Patent No.: US 7,610,056 B2
(45) Date of Patent: Oct. 27, 2009

(54) METHOD AND SYSTEM FOR PHONE-NUMBER DISCOVERY AND PHONE-NUMBER AUTHENTICATION FOR MOBILE COMMUNICATIONS DEVICES

(75) Inventors: Charles B. Zapata, Redmond, WA (US); Daniel J. Shapiro, Redmond, WA (US)

(73) Assignee: Ontela, Inc., Seattle, WA (US)

( * ) Notice: Subject to any disclaimer, the term of this patent is extended or adjusted under 35 U.S.C. 154(b) by 0 days.

(21) Appl. No.: 11/732,508

(22) Filed: Apr. 2, 2007

(65) Prior Publication Data

US 2007/0249375 A1    Oct. 25, 2007

Related U.S. Application Data

(60) Provisional application No. 60/788,171, filed on Mar. 31, 2006.

(51) Int. Cl.
*H04W 4/00* (2006.01)
*H04M 1/66* (2006.01)

(52) U.S. Cl. .................. 455/466; 455/410; 455/411
(58) Field of Classification Search .......... 455/410, 455/411, 466
See application file for complete search history.

(56) References Cited

U.S. PATENT DOCUMENTS

| | | | | |
|---|---|---|---|---|
| 6,993,658 | B1* | 1/2006 | Engberg et al. | 713/185 |
| 2002/0186845 | A1* | 12/2002 | Dutta et al. | 380/247 |
| 2003/0078058 | A1* | 4/2003 | Vatanen et al. | 455/466 |
| 2004/0120527 | A1* | 6/2004 | Hawkes et al. | 380/277 |
| 2004/0157584 | A1* | 8/2004 | Bensimon et al. | 455/411 |
| 2004/0260928 | A1* | 12/2004 | Immonen | 713/175 |
| 2005/0117554 | A1* | 6/2005 | Bleckert et al. | 370/338 |
| 2005/0227669 | A1* | 10/2005 | Haparnas | 455/410 |
| 2005/0287990 | A1* | 12/2005 | Mononen et al. | 455/411 |
| 2005/0289078 | A1* | 12/2005 | Wary et al. | 705/64 |

OTHER PUBLICATIONS

International Search Report and Written Opinion issued for PCT Application PCT/US2007/008083; Mail Date: Jan. 28, 2008: 11 Pages.

* cited by examiner

*Primary Examiner*—Barry W Taylor
(74) *Attorney, Agent, or Firm*—Fubright & Jaworski L.L.P.

(57) ABSTRACT

Methods and systems by which a client application program running on a mobile communications device can determine the telephone number associated with the mobile device and communicate the telephone number to a remote computing entity in a secure and verifiable fashion are presented herein. In one embodiment, a client application program running on a mobile device sends an SMS message to a remote server, allowing the remote server to determine the telephone number associated with the mobile device and return the determined number to the client application program in a SMS response message. A client application program running on a mobile device may also prove to a remote computing entity that the program is running on the device. The client program and remote entity may exchange information in SMS messages, and the client program may transmit information obtained from the remote entity to the remote server via WAP-based communications.

26 Claims, 6 Drawing Sheets

METHOD AND SYSTEM FOR PHONE-NUMBER DISCOVERY AND PHONE-NUMBER AUTHENTICATION FOR MOBILE COMMUNICATIONS DEVICES

CROSS-REFERENCE TO RELATED APPLICATION

This application claims the benefit of Provisional Application No. 60/788,171, filed Mar. 31, 2006.

TECHNICAL FIELD

The present invention is related to wireless communications systems and, in particular, to a method and system by which a client application running on a mobile communications device can determine the telephone number of the mobile communications device and prove, to a remote entity, that the client application program is running on a mobile communications device associated with the telephone number.

BACKGROUND OF THE INVENTION

Modern mobile communications devices, such as mobile phones, are essentially small, portable computing devices. Mobile communications devices include processors, memory, operating systems, and display devices that provide an execution environment for execution of various application programs and routines, in addition to wireless communications hardware and software. A client application program running on a mobile communications device may exchange short text messages with remote computing entities, such as remote servers, via the short message service ("SMS"). In addition, a client application program running on a mobile communications device can communicate, in traditional request/response fashion, with remote web servers via the wireless application protocol ("WAP"). Although client application programs may run on mobile communications devices, they may not be fully integrated with the telecommunications hardware and software within the mobile communications devices. As one example, in many mobile-communications-device execution environments, a client application program cannot determine, via internal API calls or system calls, the telephone number currently associated with the mobile communications device.

In certain cases, a client application program executing on a mobile communications device may need to securely and verifiably furnish the telephone number associated with the mobile communications device to a remote computing entity. As a result, developers of client application programs for mobile communications devices, mobile-communications-device vendors, wireless network providers, mobile-communications-device designers, developers, and vendors, and users of mobile communications devices have all recognized the need for a method and system by which a client application program, executing within a mobile communications device, can ascertain the telephone number currently associated with the mobile communications device and communicate that telephone number, in a secure and verifiable manner, to a remote computing entity.

SUMMARY OF THE INVENTION

Embodiments of the present invention are directed to methods and systems by which a client application program running on a mobile communications device can determine the telephone number associated with the mobile communications device and communicate the telephone number to a remote computing entity in a secure and verifiable fashion. In one embodiment of the present invention, a client application program running on a mobile communications device sends an SMS message to a remote server, allowing the remote server to determine the telephone number associated with the mobile communications device and return the determined telephone number to the client application program in a SMS response message. In another embodiment of the present invention, a client application program running on a mobile communications device can prove to a remote computing entity that the client application's program is running on a mobile communications device associated with a particular telephone number. The client application's program and remote computing entity exchange information in SMS messages, and the client application program finally transmits secret information obtained from the remote computing entity back to the remote server via WAP-based communications.

DETAILED DESCRIPTION OF THE INVENTION

Embodiments of the present invention are directed to methods and systems by which a client application program, or another executable entity, executing on a mobile communications device can ascertain the telephone number associated with the mobile communications device, as well as methods and systems by which a client application program, or another executable entity executing on a mobile communications device can, in a secure fashion, prove to a remote computing entity that the client application program or other executable entity is executing on a mobile communications device associated with a particular telephone number. In the following discussion, a number of particular embodiments of the present invention are described with reference to figures and control-flow diagrams. However, these particular embodiments are meant only to illustrate the more general concepts to which method-and-system embodiments of the present invention are directed.

In a first subsection, below, a brief summary of wireless communications systems is provided. This material is included only to show some of the complexity below the high-level abstraction at which embodiments of the present invention are discussed. In a next subsection, a brief introduction to computational cryptography is provided. Finally, in a third subsection, embodiments of the present invention are discussed.

Wireless Communications Systems

Figure 1:
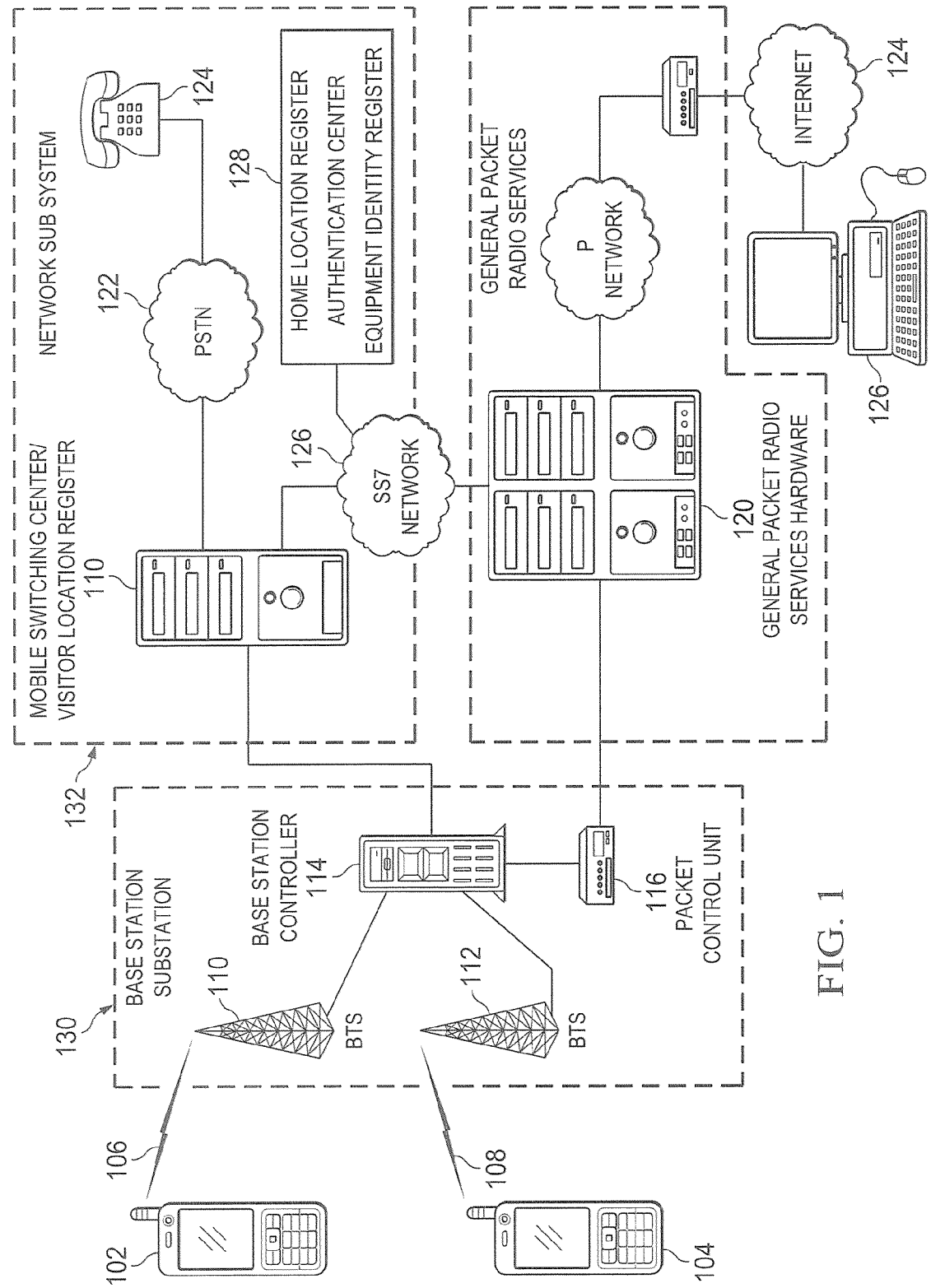
FIG. 1 shows a relatively high-level diagram of a generalized mobile-phone communications system.

FIG. 1 shows a relatively high-level diagram of a generalized mobile-phone communications system. There are many different types of mobile-phone systems and technologies. FIG. 1 is intended to show, at very high level, basic features of one such system, the global system for mobile communications ("GSM"), currently servicing over two billion mobile-phone users in more than 212countries and territories throughout the world. GSM is a second-generation mobile-phone system, supporting both digital-data exchange and speech channels. Mobile phones, such as mobile phones 102 and 104 in FIG. 1, communicate with the GSM system via radio-frequency signals 106 and 108. Mobile phones communicate via radio-frequency signals with base transceiver stations ("BTSs") 110 and 112 that each comprises equipment for transmitting and receiving radio signals, including antennas and communications equipment for transforming the radio-frequency-encoded information into pulse-code-modulated ("PCM") digital information that can be exchanged with a base-station controller 114, and transforming PCM-encoded information back to radio-frequency signals for transmission to mobile phones.

The GSM system supports both voice signals and packet-based information exchange, with packet-based information exchange controlled by a packet-control unit 116. Voice data is transmitted by the base station to a mobile switching center 118, and the packet-based data is exchanged between the packet-control unit 116 and general-packet-radio-services ("GPRS") hardware 120. Voice data can be routed by the mobile switching center to the same or different base stations for broadcast to mobile phones, routed to different mobile-phone networks, and routed into the public switched telephone network 122 for transmission to land-line-based telephones 124. Packet-based data can be routed by the GPRS into digital communications networks and eventually, via the Internet 124, to computers and other devices that communicate via packet-based protocols 126. Both the mobile switching center and GPRS hardware can exchange data through an SS7 network 126, and, through the SS7 network, can access a home location register, authentication center, and equipment identity register 128.

The base station controller ("BSC") 114 allocates radio channels, controls handovers of communications links from one BTS to another, and can, in certain implementations, serve as switching centers. A BSC, along with multiple BTSs and a packet-control unit, together comprise a base station substation ("BSS") 130. A mobile switching center, home location register, authentication center, and equipment identity register, together with PSTN and SS7 network connections, comprise a network switching subsystem ("NSS") 132. The NSS carries out switching functions and manages communications between mobile phones and the PSTN. The architecture of the NSS resembles a telephone exchange, with additional functionality needed for managing mobile end points. The NSS is generally considered to handle circuit-switched information exchange, including voice data, short-messaging services ("SMS") for exchange of text-based messages between mobile phones, and circuit-switched data calls.

The home location register is a central database that contains information describing each mobile-phone subscriber of the carrier service to which the network switching subsystem 132 belongs. Mobile-phone subscribers, or users, are identified via a subscriber identity module ("SIM"), or SIM card, that is inserted by the user into the user's mobile phone. The SIM card contains information identifying the user, subscription information, and the user's phonebook. The SIM card also include cryptography-related secret information that allows for encryption of voice signals and data transfers exchanged between a user's mobile phone and a base station substation. The home location register stores details of each user's SIM card and SIM-card contents, and manages mapping of users to geographical locations, so that calls can be directed to users and so that users can make calls from the users' current locations. The authentication center authenticates the SIM card of a mobile phone attempting to connect to the GSM network, and generates encryption keys for each connection to allow voice and data signals to be encrypted. The authentication center provides information to the mobile switching center 118 that allows the mobile switching center to authenticate users and to allow the MSC to carry out secure information exchanges with a mobile phone. The mobile phones 102 and 104 are essentially computing devices that run operating systems for supporting various applications and mobile-phone user interfaces.

The GSM system, described with reference to FIG. 1, represents an example of a second-generation wireless communications system. Recently, third-generation wireless communications systems have begun to be employed. Certain of these third-generation systems employ code-division multiple access technologies, which use spread-spectrum communications. In these spread-spectrum communications systems, analog audio input is digitized to produce binary elements that are then transmitted at deterministically varying frequencies that can be received only by transmitters that receive the signal at the same varying frequencies. The frequency varies according to a code, or pattern. CDMA provides a greater number of channels per bandwidth, by a factor of two or more, than the time-division-multiplexing techniques used by GSM.

Of course, wireless communications will continue to evolve and develop as new approaches, hardware capabilities, and communications-device capabilities arise. The method and system embodiments of the present invention will be applicable to all such systems in which at least two different communications media, such as SMS and WAP, are provided.

Cryptography

Figure 2A:
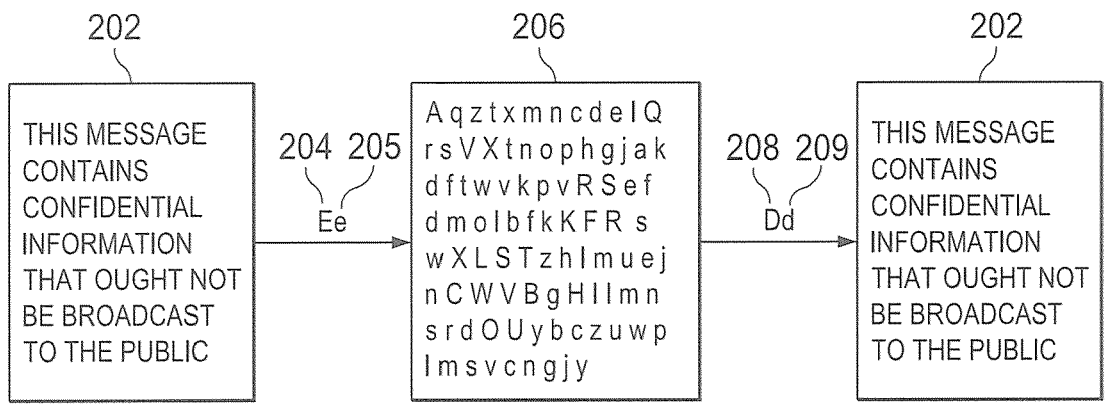
FIGS. 2A-B illustrate basic principles underlying cryptographic methodologies.
Figure 2B:
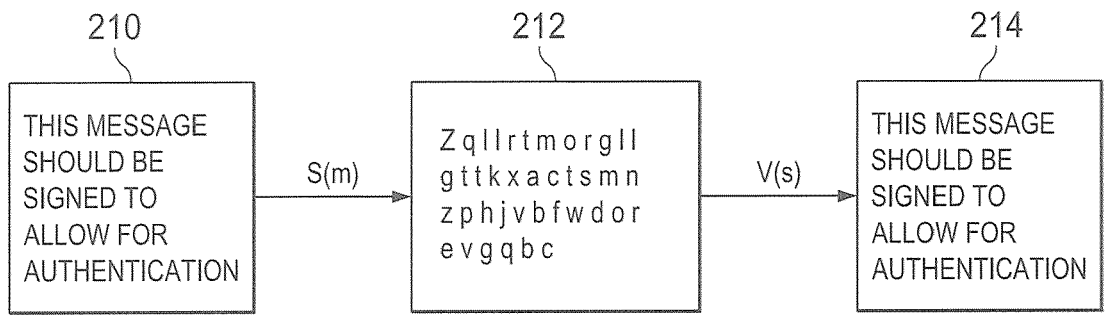

In this subsection, cryptographic methods used in various embodiments of the present invention are described. FIGS. 2A-B illustrate basic principles underlying cryptographic methodologies. In one aspect of cryptography, cryptographic methods are designed to transform plain text information into encoded information that cannot be easily decoded by unauthorized entities. For example, FIG. 2A shows a plain text message 202 that includes an English-language sentence. This plain text message can be encrypted by any of various encryption functions E 204 using a specific key 205 into a corresponding cipher text message 206 that is not readily interpretable. An authorized user is provided with a decryption function D 208 and the necessary key 209 that allows the authorized user to decrypt the cipher text message 206 back to the plain text message 202.

Public-key cryptographic methods are encryption/decryption techniques employing key pairs (e,d) having the property that, for all key pairs (e,d), it is computationally infeasible to compute d given e. Thus, the key e, called the "public key," can be freely distributed, because the corresponding key d, called the "private key," cannot easily be computed. A well-known example of public-key encryption is the RSA encryption scheme. Given two large prime numbers p and q, the RSA encryption and decryption keys and functions can be concisely described as follows:

$n = pq$ $ed \bmod (p-1)(q-1) = 1$ $$E(m) = (m^e \bmod n) = c$$

$$D(c) = (c^d \bmod n) = m$$

where n is a large integer referred to as the modulus,
- e is a chosen public key, often a prime of the form $2^x+1$, with x an integer
- d is the private key corresponding to e,
- E is an encryption function that encrypts a plain text message m to produce a cipher text message c, where the symbols of the plain text message are considered to form a first large number, and where the symbols of the plain text message are considered to form a first large number, and
- D is a corresponding decryption function.

Thus, a plain text message is encrypted by considering all of the numeric representations of the characters of the message to be a single large number, computing the result of raising the large number to a power equal to the public key e, and using the remainder of the division by n as the encrypted message. Decryption employs a similar process, raising the cipher-text message to a power equal to the decryption key d, then regenerating the plain text message by considering the remainder of division by n, as a string of numerically represented characters. The encrypted message is as secure as access to the decryption key d is secure.

A digital signature is a value generated from a message that can be used to authenticate the message. Generation of a digital signature involves a digital signature generation function S:

$$S(m) \rightarrow s$$

where m is a message to be signed, and
s is the digital signature.

A digital signature s is sent, along with the message m from which the digital signature is generated, to a recipient. The recipient employs a public validation function V to determine whether the digital signature authenticates the message or, in other words, whether the message was composed by the signer, and has not been modified in the interim. Thus, V can be expressed, as follows:

$$V(m,s) \rightarrow \{true, false\}$$

where the result true indicates that the message m was composed by the signer who provided the digital signature s.

A digital-signature system can be generated from a reversible public-key encryption system, defined as follows:

for all $m$, $D_d(E_e(m)) = E_e(D_d(m))$

For example, the above-described RSA system is reversible, and a digital-signature-generating function S can be selected as:

$$S = D_d$$

so that:

$$S(m) = D_d(m) = s$$

The validation function V can then be selected as:

$$V(m, s) = \begin{cases} \text{true, if } E_e(s) = m \\ \text{false} \end{cases}$$

Thus, the techniques of the public key encryption technique can be used to generate digital signatures that can, in turn, be used by a digitally signed message recipient to verify that a message was sent by the party supplying the message m and the digital signature s. Note that, in certain applications, the digital signature s is all that needs to be communicated to a subsequent authenticator, if the authenticator can verify that the unsigned digital signature is valid by using information recovered by unsigning, or validating, the digital signature. In such cases, the validation function V can then be selected as:

$$V(s) = \begin{cases} \text{true, if}(E_e(s))[i] = \text{expected value } i \\ \text{false} \end{cases}$$

where $(E_e(s))[i]$ is the value of the ith field within the message m recovered by applying the validation function to the digital signature." In this case, the digital signature s is referred to as the "signed message." In alternative schemes, more than a single, recovered field value may be used for validation. This latter form of validation is illustrated in FIG. 2B, showing a plain text message signed to produce a signed message 212 from which the original message 214 can be regenerated by application of the validation function. In this case, recovering a recognizable and pertinent message may be sufficient to complete the validation operation. Note that, although signing and validation appear similar to encryption and decryption, validation involves using a public key, so that the plain text version of the seemingly encrypted, signed message is available to anyone possessing the public key.

A cryptographic hash function produces a relatively small hash value, or message digest, from a large message in a way that generates large distances in hash-value space between hash values generated from message inputs relatively close together in message-input space. In other words, a small change to an input message generally produces a hash value well separated from the hash value generated for the original message, in hash-value space. One example of a cryptographic hash function widely used for this purpose is the Secure Hash Algorithm ("SHA-1") specified by the Secure Hash Standard, available at the web site specified by the URL: http://www.itl.nist.gov/fipspubs/fip180-1.htm. The SHA-1 cryptographic hash algorithm generates a 160-bit hash value, called a message digest, from a data file of any length less than $2^{64}$ bits in length. The SHA-1 algorithm is a cryptographic hash because it is computationally infeasible to find a message which corresponds to a given message digest, or to find two different messages which produce the same message digest. Digital signatures are often produced by signing cryptographic hash values produced from messages, rather than from the messages themselves. In this way, the digital signatures are compact, and can be computationally efficiently transmitted and validated. A cryptographic hash value is also a good choice for the value of a field within a signed message used during the validation process, as discussed above.

Embodiments of the Present Invention

Figure 3:
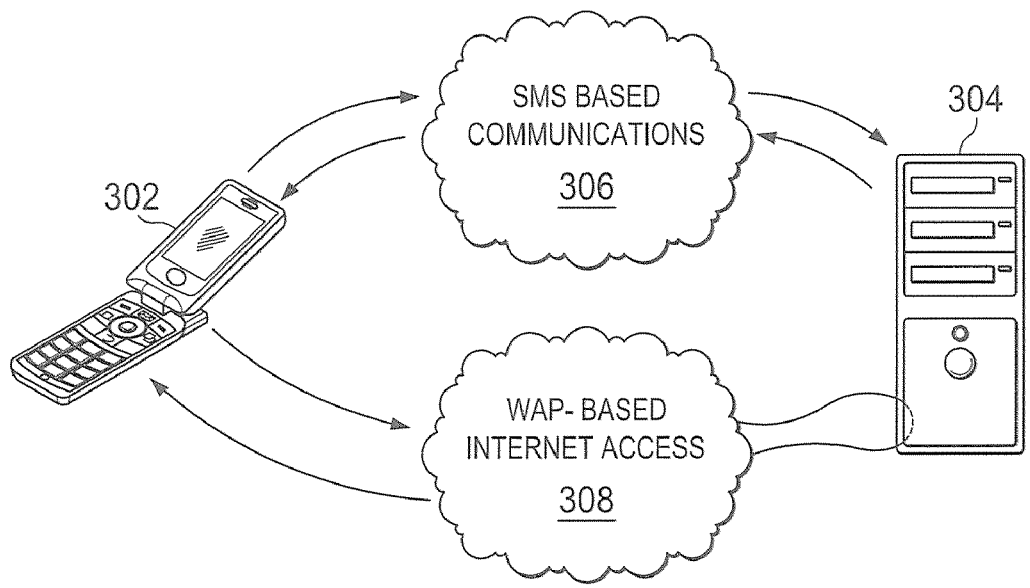
FIG. 3 illustrates a simplified view of a wireless communications environment in which methods and systems of the present invention find application.

FIG. 3 illustrates a simplified view of a wireless communications environment in which methods and systems of the present invention find application. This simplified view can be compared with FIG. 1, also a high-level, abstract view of an extremely complex, underlying system, to appreciate the level of abstraction represented by FIG. 3.

As shown in FIG. 3, an application program, or other computational entity, executing on a mobile phone 302 can communicate with a remote server computer 304 via SMS messages 306 or via request/response transactions made through WAP-based Internet access 308. In general, SMS messages can be sent either from the client application program executing on the mobile phone 302 to the remote server 304, or from the remote server to the mobile phone, the operating system of which can direct the SMS message to a particular client application program. By contrast, in the case of WAP-based communications 308, a client application program executing on the mobile phone 302 may request web pages from a remote web server, and receive the requested web pages via the WAP-based communications 308, but the server computer cannot initiate an exchange of information, or transmission of information, to the client application program running on a mobile communications device 302. The remote server may host a modem, for communication via the public switched telephone network, or may be connected via a local area network, the Internet, or by another digital communications medium, to a different server or computational entity that can exchange messages through public switched telephone network or directly with a carrier service.

The reason for the lack of symmetry with regard to information-transmission initiation in WAP-based communications is that the carrier service serves as a collection and distribution point for WAP-based communications with mobile communications devices, and funnels all Internet traffic from subscribers through a WAP proxy/gateway, maintained by the carrier services to all remote servers and other computational entities accessible via the Internet. A server computer responds to all mobile communications devices managed by a particular carrier service by transmitting requested pages, and other requested information, to a single IP address, or small number of IP addresses, associated with the carrier service, and the carrier then distributes the web pages and other requested information via carrier-specific communications methods to individual mobile communications devices. Thus, a remote server does not have an IP address for a particular mobile communications device to which the remote server can initiate transmission of information.

Figure 4A:
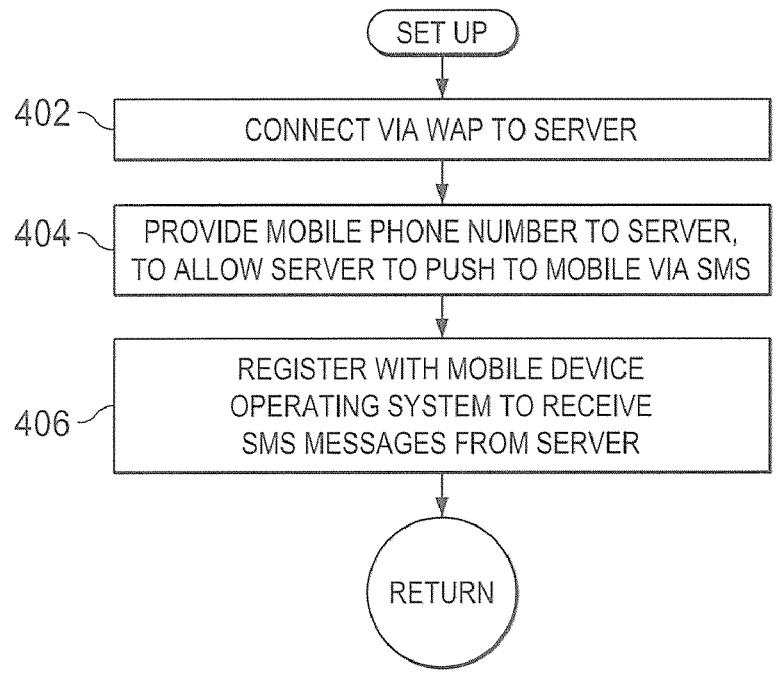
FIG. 4A illustrates a set-up routine by which the client application program arranges to receive asynchronous messages from the remote server.
Figure 4B:
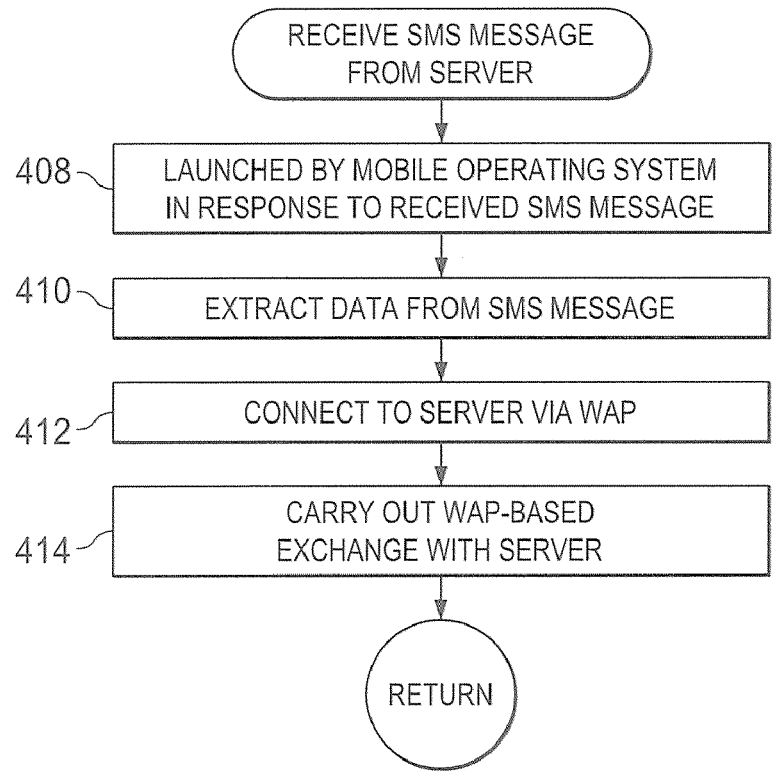
FIG. 4B illustrates a control-flow diagram for asynchronous SMS-message reception and forwarding to a client application program by a mobile communications device.

FIGS. 4A-B illustrate a scenario in which a client application program running on a mobile communications device may need to set up an environment for receiving asynchronous, server-initiated SMS messages from a remote server to alert the client application program of events to which the client application program may need to respond. Consider a client application program that implements a continuous-information service by receiving and displaying frequent updates with respect to market, transaction, or environmental information, including stock reports, sales reports, and weather reports. When notified by a remote server of new information to display to the user of a mobile communications device and subscriber to the continuous-information service, the client application program is launched or awakened to request new information, via WAP-based communications, from the remote server and to display the requested information to the user through a browser-like display system.

FIG. 4A illustrates a set-up routine by which the client application program arranges to receive asynchronous messages from the remote server. In step 402, the client application program connects to the remote server via WAP-based communications. In step 404, the client application program provides to the remote server the telephone number of the mobile communications device on which the client application program is executing, so that the remote server can send SMS-message alerts to the mobile communications device, which can, in turn, launch or awaken the client application program to receive the SMS-message alert. Finally, in step 406, the client application program registers with the mobile-communications-device operating system, in certain cases, in order to receive SMS messages directed to the mobile communications device for reception by the client application program. In certain systems, a client application program can register with the mobile-communications-device operating system in order to receive SMS messages directed to particular ports. Thus, in step 404, the client application program additionally indicates, to the remote server, to which SMS port on the mobile communications device to send SMS messages to the client application program. In other systems, the remote server may embed identification information within SMS messages to direct the SMS messages, via the mobile-communications-device operating system, to the client application program, in which case the client application program needs, in step 404, to additionally indicate to the remote server the identification information for inclusion by the remote server in SMS alert messages to direct the SMS alert messages to the client application program. Other, alternative mechanisms for directing SMS messages to a particular client application program may be used in different types of systems, and included in alternative set-up routines in steps 404 and 406. The method chosen by the client application program to direct SMS alert messages to itself may be mobile-communications-device and mobile-communications-device-operating-system specific, and, may as well be determined by preferences or capabilities of a remote server.

FIG. 4B illustrates a control-flow diagram for asynchronous SMS-message reception and forwarding to a client application program by a mobile communications device. In step 408, the operating system of the mobile communications device receives the SMS message from a remote server and determines, in any of a number of different ways, to which client application program the SMS message is directed. In some cases, the mobile-communications-device operating system then launches the client application program, if it is not already executing, in order to receive the message. In certain cases, the client application program may have been launched at a previous point in time, and may be suspended for awakening upon receipt by the operating system of an asynchronous event, such as an SMS message directed to the client application program. In still other circumstances, the operating system may simply post the received SMS message to a message queue, from which the client application program subsequently de-queues and receives the message. Once the client application program has received the SMS message, the client application program extracts data included in the message, in step 410, connects to the remote server via WAP-based communications, in step 412, if the client application program is not already connected to the remote server, and carries out a WAP-based information exchange with the remote server, in step 414, in order to acquire updated information for subsequent display to a user.

While FIGS. 4A-B illustrate one scenario in which a client application program needs. to receive synchronous SMS messages from a remote web server, many other scenarios are possible. Generally, in any situation in which a remote server needs to transmit information not directly requested by a computational entity executing on a mobile communications device to the computational entity, the remote server needs to transmit, as an SMS alert message, an indication of the availability of information to the computational entity so that the computational entity can then access the information via WAP-based communications.

Returning to step 404 in FIG. 4A, the client application program needs to provide the telephone number associated with the mobile communication device on which the client application program is executing to the remote server. However, as discussed above, in many currently available mobile-communications devices, there is no direct, architected way for a client application program executing on a mobile communications device to obtain the telephone number associated with the mobile communications device. Additionally, because SMS messages can be made to appear to have been sent by one device, while actually having been sent by another device, the remote server may need to verify that the telephone number sent by a client application program to the remote server is the telephone number associated with the mobile communications device on which the client application program is executing. Otherwise, remote servers could be easily fooled into sending information to, and accepting information from, fraudulent and malicious application programs seeking to eavesdrop, interfere with transactions, or carry out fraudulent transactions associated with telephone numbers improperly obtained by the fraudulent and malicious application programs. For these reasons, the simple set-up procedure shown in FIG. 4A needs to be modified.

Figure 5:
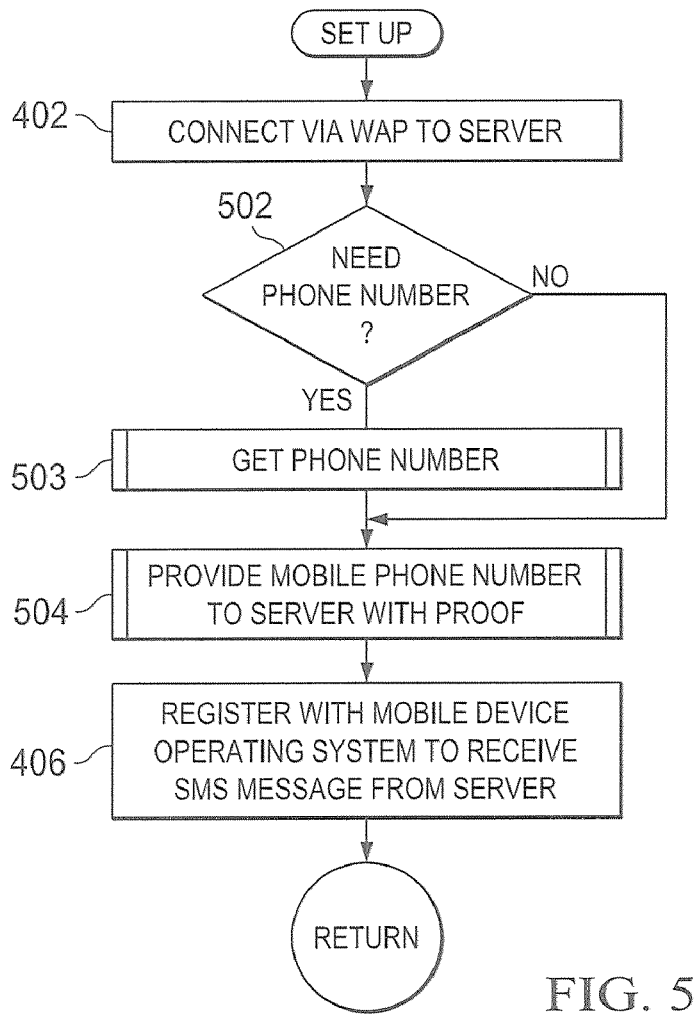
FIG. 5 shows a modified control-flow diagram for the set-up procedure shown in FIG. 4A.

FIG. 5 shows a modified control-flow diagram for the set-up procedure shown in FIG. 4A. FIG. 5 includes the same first and last steps as shown in FIG. 4A, which are identically numbered in FIG. 5, for the sake of clarity. However, in place of step 404 in FIG. 4A, FIG. 5 includes steps 502-504. In step 502, the client application program determines whether or not the client application program needs to obtain the telephone number associated with the mobile communications device on which the client application program is executing. The client application program may need to initially obtain the telephone number, following an initial launch, and may subsequently need to again obtain the telephone number in the event that the telephone number of the mobile communications device has temporarily or permanently changed. If the client application program needs to obtain the telephone number, as determined in step 502, then a routine is called, in step 503, to obtain the telephone number. A second routine is then called to provide the telephone number to a remote server and prove, to the remote server, that the telephone number provided to the remote server is the telephone number associated with the mobile communications device in which the client application program is currently executing. It should be noted that the remote server with which the client application program communicates in order to obtain the telephone number associated with the mobile communications device, as discussed below, may be the same or may be different from the remote server to which the client application program provides the telephone number in step 504.

Figure 6:
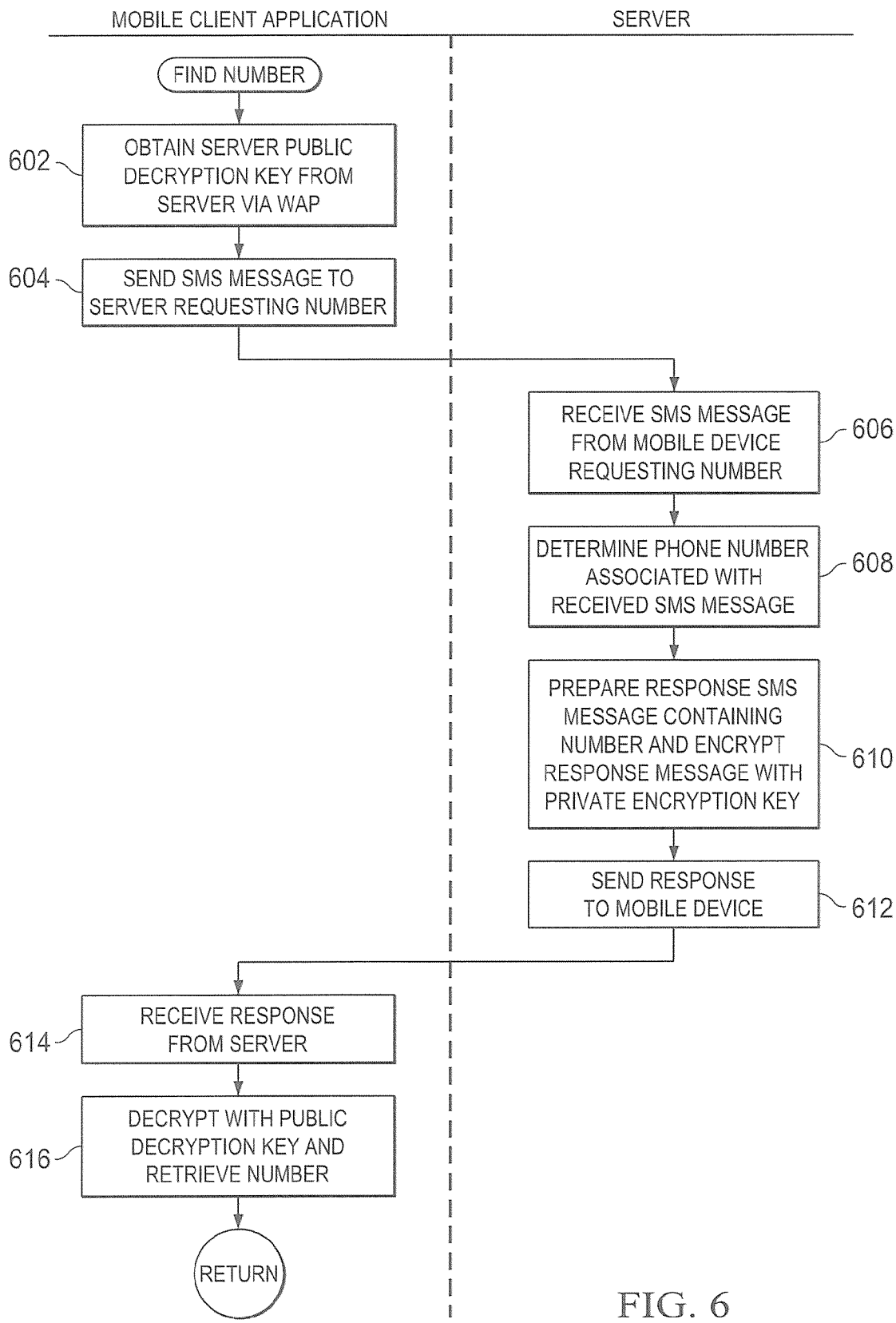
FIG. 6 is a control-flow diagram illustrating one embodiment of the present invention, a find-phone-number routine called in step 503 of FIG. 5.

FIG. 6 is a control-flow diagram illustrating one embodiment of the present invention, a find-phone-number routine that may be called in step 503 of FIG. 5. It should be noted that there are many alternative ways of securely determining a mobile-communication-device telephone number via SMS messaging that represent alternative embodiments of the present invention, and that the method shown in FIG. 6 is but one of many possible embodiments of the present invention. In step 602, the client application program obtains a server-provided public decryption key from the server via WAP communications, such as one of a pair of keys generated by a reversible-encryption/decryption-key pair. In alternative embodiments, the server-provided decryption key may be encoded within the client application program, or it may be obtained by, and stored by, the client application program at initial launch or at some point prior to execution of the find-number routine. Next, in step 604, the client application program constructs an SMS message and sends the SMS message to the server. The SMS message is a request for the server to return to the client application program the telephone number associated with the mobile communications device on which the client application program is executing. In alternative embodiments, the SMS message may be encrypted. In step 606, the remote server receives the SMS message from the mobile communications device. In step 608, the remote server determines the telephone number of the mobile communications device either from a header within the received SMS message, from an SMS-communications API call, or from some other method. Then, in step 610, the server prepares a response SMS message containing the telephone number determined in step 608, and encrypts the response message with a private server encryption key. Then, in step 612, the server sends the encrypted response SMS message back to the client application program. In step 614, the client application program receives the response from the server and, in step 616, decrypts the received message using the server-provided decryption key, retrieving from the decrypted message the telephone number associated with the mobile communications device on which the client application program is executing.

In other words, while the client application program executing on a mobile communications device may not be able to directly determine the telephone number associated with that mobile communications device, by sending an SMS message to a server, a client application program may direct the remote server to determine the telephone number associated with the mobile communications device from which the SMS message was sent via information available to the remote server that accompanies, or that accompanies receipt of, an SMS message, and to return the determined telephone number to the client application program via an SMS response message. In the embodiment shown in FIG. 6, encryption of the response message by the remote server ensures to the client application program, upon successful decryption using the server-provided decryption key, that the response message was sent to the client application program from the remote server, and not from a fraudulent and/or malicious remote entity that intercepted the telephone-number request sent by the client application program in step 604. There are many other methods, generally involving transmission of secret information in one or both directions between the client application program and remote server, to ensure that the response message received by a client application program is valid and was sent by a particular remote server, include digital signatures.

Figure 7:
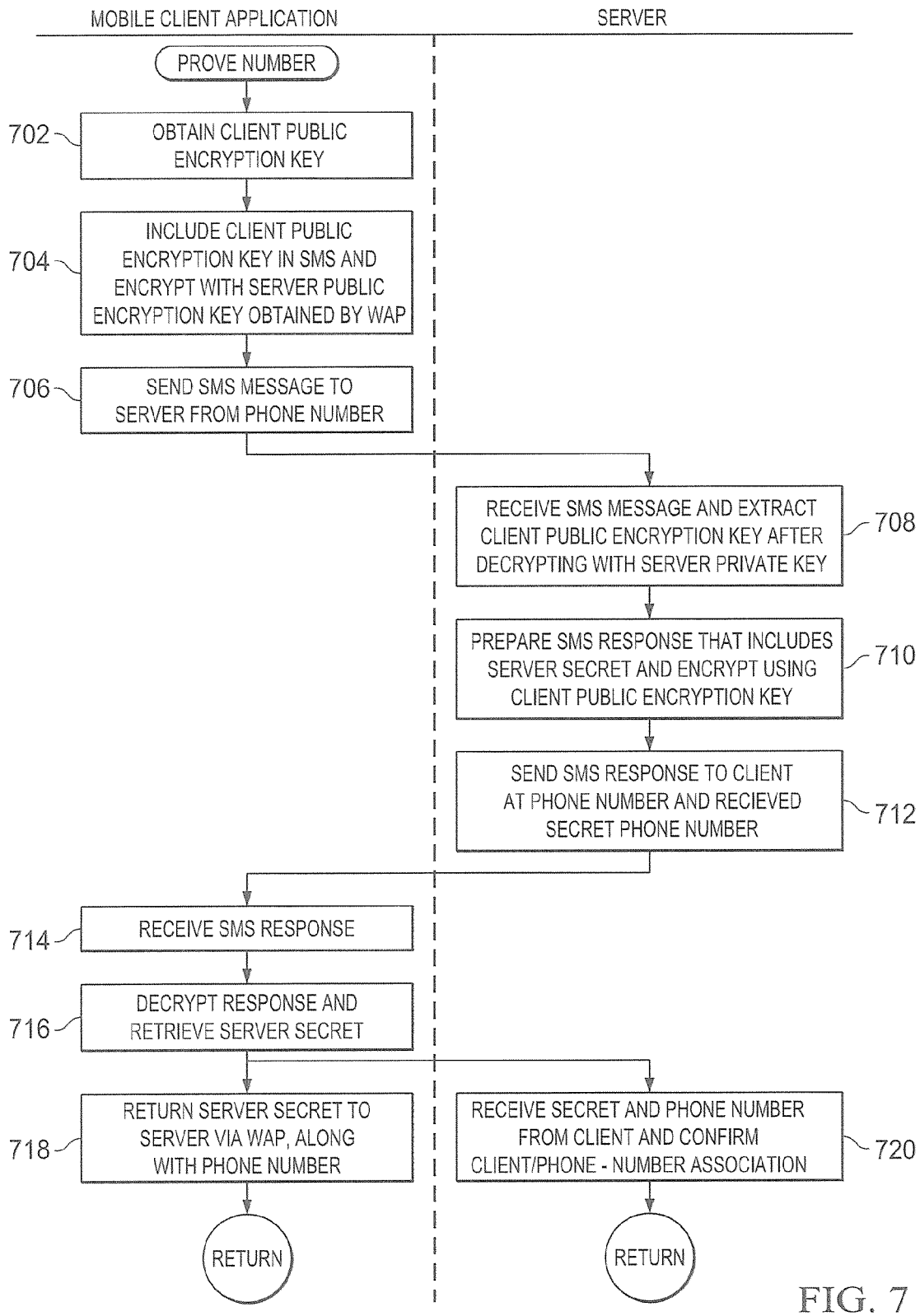
FIG. 7 is a control-flow diagram for a prove-number routine that represents one embodiment of the present invention, and that may be used in step 504 of FIG. 5.

FIG. 7 is a control-flow diagram for a prove-number routine that represents one embodiment of the present invention, and that may be used in step 504 of FIG. 5. As with the find-telephone-number routine shown in FIG. 6, there are many possible embodiments of the prove-number-routine shown in FIG. 7.

In step 702, the client application program obtains a client public encryption key. This client public encryption key may, in certain embodiments, have been encoded within the client application program. In other embodiments, this client public encryption key may be generated algorithmically by the client application program using a cryptographically strong encryption-key generator, or some other algorithmic technique. Next, in step 704, the client application program includes the client public encryption key in an SMS message. In certain embodiments of the present invention, the client application program may additionally include the telephone number of the mobile communications device in the SMS message, as an additional check. The client application program then may encrypt the SMS message with a server public encryption key either encoded within the client application program or obtained by the client application program via WAP communications with the server. In step 706, the client application program sends the SMS message to the remote server via SMS communications from the mobile communications device on which the client application program is running.

In step 708, the server receives the SMS message by the client application program and, when the SMS message has been encrypted by the client application program, decrypts the SMS message using a server private decryption key in order to obtain the client public encryption key included in the SMS message. In certain embodiments, in which the client application program includes the telephone number which the client application program believes to be associated with a mobile communications device on which the client application program is running, the server can compare the telephone number extracted from SMS message to the actual telephone number included in the header of the received SMS message, or obtained from an SMS-messaging-system API call, in order to check that the telephone number which the client application program believes to be associated with the mobile communications device is, in fact, the telephone number of the mobile communications device. If not, in these alternative embodiments, the server may send an appropriate error response to the client application program. In step 710, the server prepares an SMS response message that includes a server secret and encodes the response message with the public client encryption key extracted from the received SMS message, in step 708. Then, in step 712, the server sends the SMS response back to the client application program. In step 714, the client application program receives the SMS response, decrypts the response, in step 716, using the private client decryption key, and extracts the server secret information from the response message. Finally, in step 718, the client application program returns the extracted server secret to the server via WAP-based communications. In step 720, the server receives the secret information and telephone number from the client application program via WAP communications, and confirms that the client application program is, in fact, associated with the telephone number. The secret information may be a secret value or text string, or may be an encryption key with which the client application program can encode information for sending to the remote server via WAP-based communications.

In alternative embodiments, additional messages may be exchanged between the remote server and the client application program to acknowledge confirmation, and, in the case that the association between the client application program and telephone number is not confirmed, various error messages may be additionally exchanged. There are a large number of different ways of securing the telephone-number-proving exchange from eavesdroppers and fraudulent computational entities. While, in the embodiment shown in FIG. 7, some type of server secret information is returned to the client application program, in step 712, in alternative embodiments, digital signatures, additional encryption steps, and other means may be used. In general, embodiments of the present invention prove an association between a client application program and telephone number by some exchange of encryption keys and/or other types of secret information via SMS messages followed by transmission of secret information, encryption keys, or other such information via WAP-base communications. In the embodiment shown in FIG. 7, telephone-number proof is initiated by the client application program. In alternative embodiments, a server may initiate the telephone-number proof by first sending a proof-request SMS message to the client application program, which can then undertake the steps shown in FIG. 7, or alternative steps corresponding to alternative embodiments of the present invention, in order to prove to the remote server that the client application program is running on a mobile communications device with a particular telephone number. Although the present invention has been described in terms of particular embodiments, it is not intended that the invention be limited to these embodiments. Modifications within the spirit of the invention will be apparent to those skilled in the art. For example, embodiments of the present invention may be encoded in any number of different programming languages for execution on any number of different operating systems and mobile-communications-device operating systems, using different control structures, variables, organizations, or other such programming and development parameters. While the embodiments discussed above use particular message exchanges, encryption steps, and exchange of secret information, many other, alternative mechanisms may be used to secure both the telephone-number-proof exchange as well as the exchange designed to determine a telephone number of the mobile communications device on which a client application program is executing. While SMS and WAP communications are specifically disclosed in the above-described embodiments of the present invention, alternative method and system embodiments of the present invention may employ other types of communications protocols and media for obtaining device-associated information, in addition to a telephone number, as well as proving a device/information association to a remote server. While the above-described embodiments are directed to client application programs running on mobile phones, alternative embodiments of the present invention may be directed to client application programs running on computers and hand-held electronic devices, other than mobile phones, that include cellular modem cards or built-in cellular-wireless functions that allow the computers and hand-held devices to interface to remote computational entities via at least two different communications media, such as SMS messaging services and WAP-based communications.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method for obtaining, by a local computational entity running on a mobile communications device, information associated with said mobile communications device that is not directly available to the local computational entity, the method comprising:
  sending a request message by the local computational entity to a remote computational entity requesting specific information previously associated with said mobile communications device; and
  receiving, by the local computational entity, said requested information previously associated with the mobile communications device from the remote computational entity in a response message.

2. The method of claim 1 wherein the local computational entity is a client application program.

3. The method of claim 1 wherein the remote computational entity is a remote server.

4. The method of claim 1 wherein the mobile communications device is one of:
  a mobile phone;
  a computer that includes a cellular modem card;
  a computer that includes built-in cellular-wireless functions;
  a hand-held electronic device that includes a cellular modem card; and
  a hand-held electronic device that includes built-in cellular-wireless functions.

5. The method of claim 1 further including:
upon reception, by the remote computational entity, of the request message, determining the information associated with the mobile communications device from at least one of: a request-message header or other message-receiving-associated information.

6. The method of claim 1 wherein the request message and response message are SMS messages.

7. The method of claim 1 wherein the response message is encrypted by a secret encryption key available to the remote computational entity, the method further including:
decrypting the response message, by the local computational entity using a decryption key to obtain the information associated with the mobile communications device.

8. The method of claim 1 wherein the information associated with the mobile communications device is a telephone number.

9. The method of claim 1 further comprising:
sending received ones of said requested information to a device remote from said mobile communication device.

10. A method for securely authenticating, to a remote computational entity, information associated with a mobile communications device by a local computational entity running on the mobile communications device, the method comprising:
sending a local public encryption key by the local computational entity to the remote computational entity in a first message via a first communications medium;
receiving, from the remote computational entity, a second message encrypted using the local public encryption key that contains secret information provided by the remote computational entity via the first communications medium;
decrypting the second message using a private local decryption key; and
sending the secret information by the local computational entity to the remote computational entity via a second communications medium.

11. The method of claim 10 wherein the local computational entity is a client application program.

12. The method of claim 10 wherein the remote computational entity is a remote server.

13. The method of claim 10 wherein the mobile communications device is one of:
a mobile phone;
a computer that includes a cellular modem card;
a computer that includes built-in cellular-wireless functions;
a hand-held electronic device that includes a cellular modem card; and
a hand-held electronic device that includes built-in cellular-wireless functions.

14. The method of claim 10 further including:
upon reception, by the remote computational entity, of the request message, determining the information associated with the mobile communications device from at least one of: a request-message header or other message-receiving-associated information.

15. The method of claim 10 wherein the first communications medium is SMS-based communications and the second communications medium is WAP-based communications.

16. The method of claim 10 wherein the secret information is a secret value, text string, encryption key, or digital signature.

17. The method of claim 10 wherein the information associated with the mobile communications device is a telephone number.

18. A mobile communications device comprising:
a computational entity local to said mobile communications device, configured to obtain information associated with said mobile communications device that is not directly available to said local computational entity:
means for sending a request message to a remote computational entity to request specific information previously associated with said mobile communications device; and
means for receiving said requested information previously associated with said mobile communications device from said remote computational entity in a response message.

19. The mobile communications device of claim 18 wherein said request message contains either a request-message header or other message-receiving-associated information.

20. The mobile communications device of claim 18 wherein said local computational entity is configured to communicate using a WAP protocol, and wherein said request message and said response message are SMS messages.

21. The mobile communications device of claim 18 wherein said information associated with the mobile communications device is a network identification number of said mobile device.

22. The mobile communications device of claim 18 wherein said local computational entity is further configured to send received ones of said requested information to a device remote from said mobile communication device.

23. The mobile communications device of claim 22 wherein said request message contains either a request-message header or other message-receiving-associated information.

24. The mobile communications device of claim 22 wherein said information associated with the mobile communications device is a telephone number.

25. A mobile communications device comprising:
a locally based application configured to securely authenticate, to a remote computational entity, information associated with said mobile communications device:
apparatus for sending a local public encryption key by said local computational entity to said remote computational entity in a first message via a first communications medium;
apparatus for receiving, from said remote computational entity, a second message encrypted using the local public encryption key that contains secret information provided by said remote computational entity via said first communications medium;
apparatus for decrypting said second message using a private local decryption key; and
apparatus for sending said secret information by said local computational entity to said remote computational entity via a second communications medium.

26. The mobile communications device of claim 25 wherein said first communications medium is SMS-based communications and the second communications medium is WAP-based communications.

* * * * *